3,439,465
CONNECTOR FOR JOINING THE PANELS
TOGETHER EDGE TO EDGE
Frank C. Du Pre, 9729 Swinton Ave.,
Sepulveda, Calif. 91343
Filed Oct. 20, 1965, Ser. No. 498,970
Int. Cl. E04c 1/10, 1/80
U.S. Cl. 52—584
4 Claims

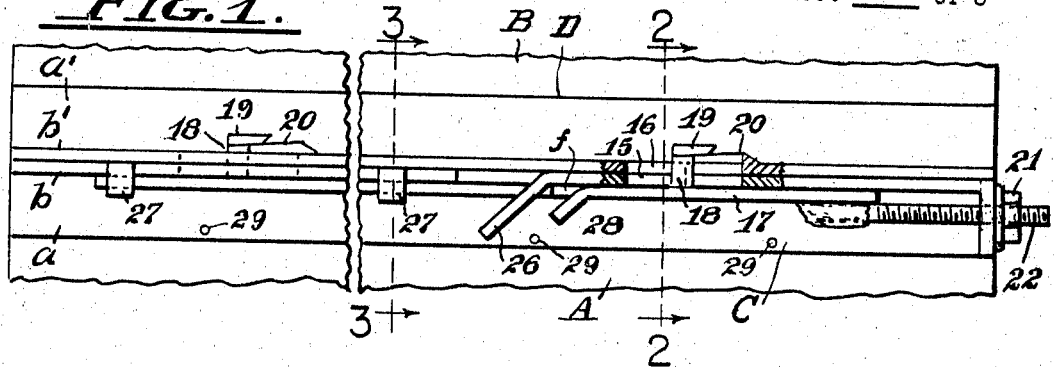
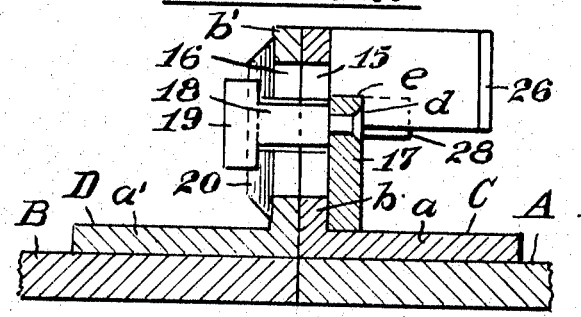
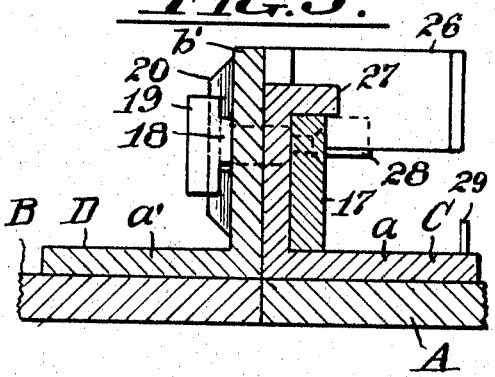
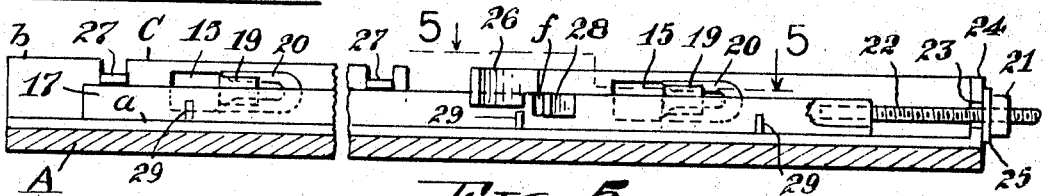
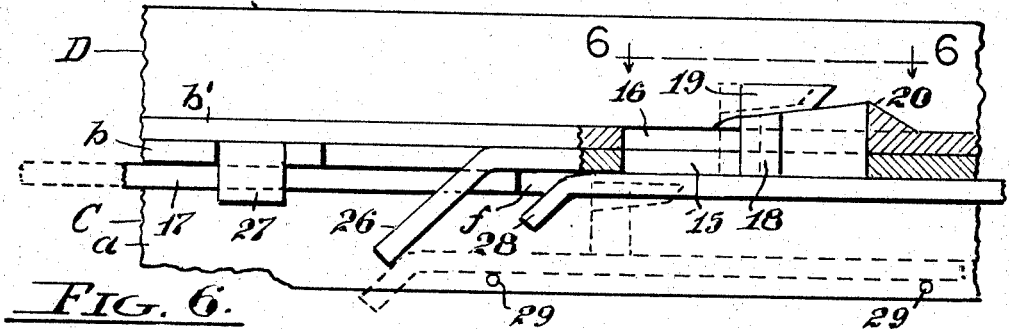
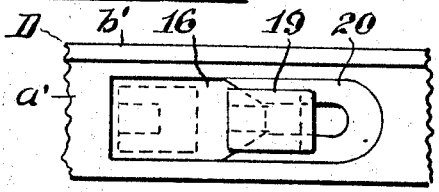

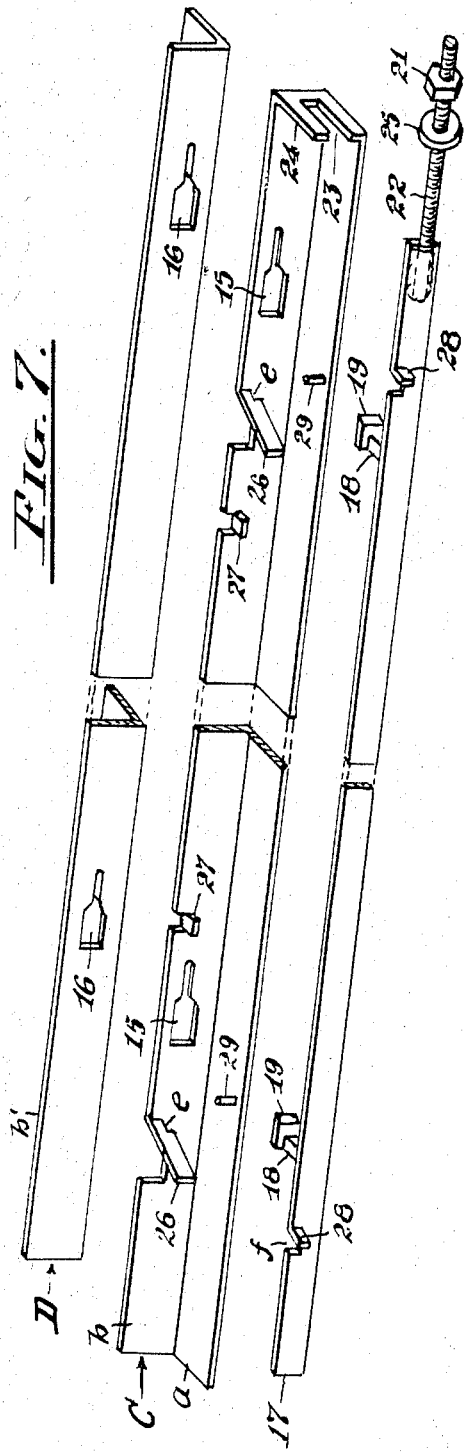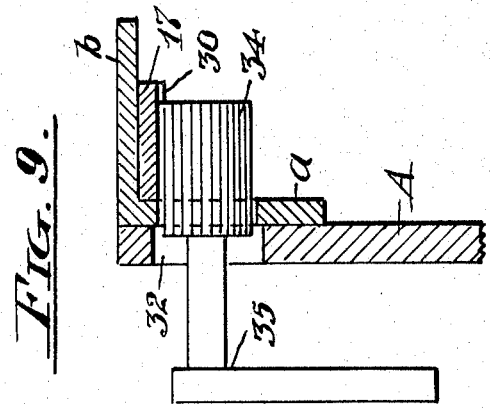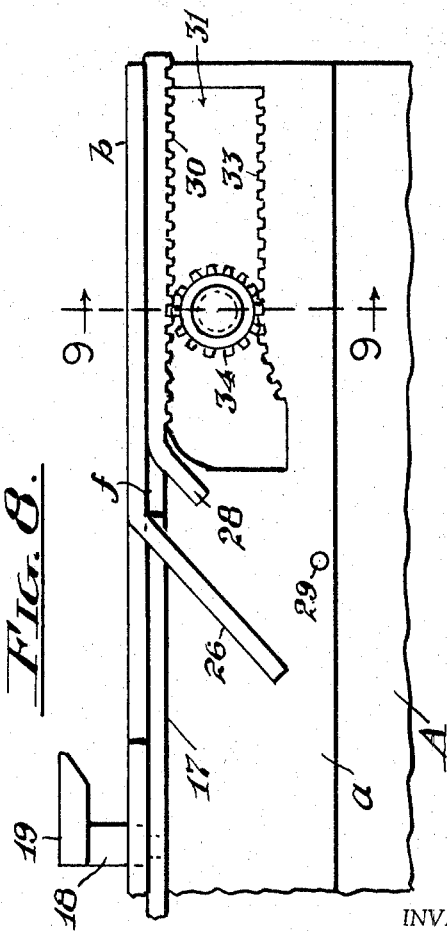

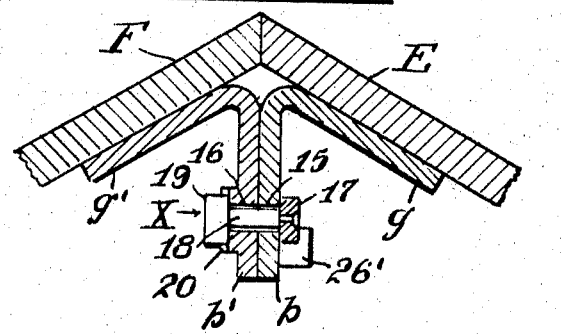
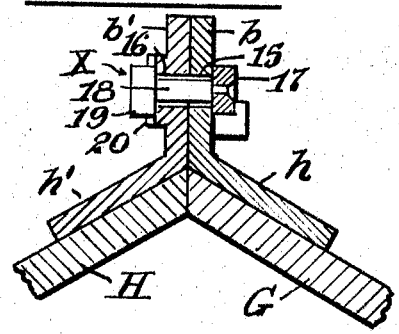
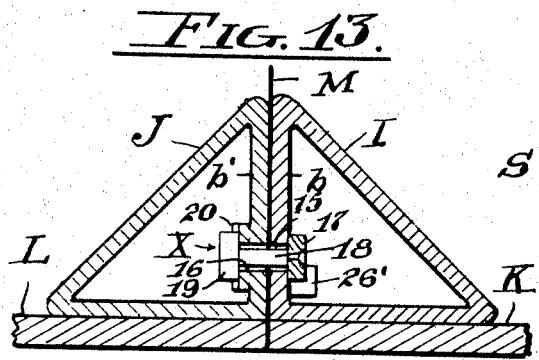
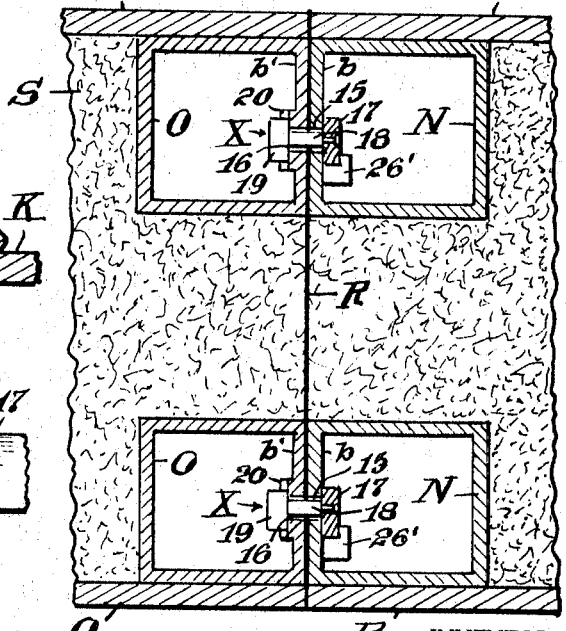
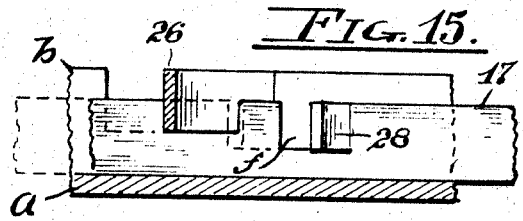
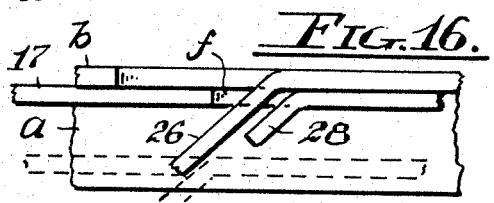
INVENTOR
Frank C. DuPre
BY R. S. Berry
ATTORNEY

# United States Patent Office 3,439,465
Patented Apr. 22, 1969

ABSTRACT OF THE DISCLOSURE

A connector for joining together panels and having projecting webs including registering complementary longitudinally extending slots. A slide-bar is reciprocally mounted on one of the webs and includes studs which extend through the slots for clamping the webs together. The slide-bar includes tongues cooperating with projections on one web to facilitate ejection of the studs from the slots.

---

This invention relates to the uniting of panels edge to edge and has as its primary object the provision of a means whereby a pair of preformed panels may be securely connected together edge to edge at intervals throughout the length thereof in a single operation upon the pair of panels being initially positioned in readiness for inter-connection and wherein such single operation joinder may be easily and quickly effected and wherein the panels may be of any desired length convenient to handling.

Another object is to provide a panel inter-connecting means of the above character whereby the connected panels may be readily separated and the structure disassembled by manipulation of the fastening means, when occasion requires.

Another object is to provide a connector embodying a slide bar having fastening elements thereon operable on movement of the slide bar longitudinally in one direction to clamp a pair of wall members face to face in tight abutting contact with each other and operable on being moved longitudinally in the opposite direction to release the fastening elements and thereby permit separation of the wall members, in which means are provided whereby on operating the slide bar to release the fastening elements, such elements will be withdrawn clear of the members previously connected thereby so that such members may be readily separated without interference.

A further object is to provide a connector which is adaptable to various applications.

With the foregoing objects in view together with such other objects and advantages as may subsequently appear, the invention resides in the parts and in the combination, construction and arrangement of parts hereinafter described and claimed and illustrated by way of example in the accompanying drawings, in which:

FIG. 1 is a plan view showing the connector as applied and as extended horizontally;

FIG. 2 is an enlarged detail in cross section and elevation taken on the line 2—2 of FIG. 1 as seen in the direction of the arrows;

FIG. 3 is a detail in cross section and elevation as seen on the line 3—3 of FIG. 1 as seen in the direction of the arrows;

FIG. 4 is a view in elevation of the structure shown in FIG. 1;

FIG. 5 is an enlarged horizontal section and plan view as seen on the line 5—5 of FIG. 4 with the panels removed;

FIG. 6 is a detail in plan as seen on the line 6—6 of FIG. 5;

FIG. 7 is an isometric view of the end portions of each of the elements of the connector showing the parts as disassembled;

FIG. 8 is a fragmentary plan view of one of the connector elements showing a modified form of the actuating mechanism;

FIG. 9 is a detail in section and elevation as seen on the line 9—9 of FIG. 8;

FIGS. 10, 11 and 12 are details in cross section depicting different applications of the connector elements;

FIGS. 13 and 14 are views in cross section showing the connector elements as applied to tubular structures;

FIG. 15 is a detail in elevation as seen on the line 15—15 of FIG. 5 showing the parts in an alternate position in dotted lines; and FIG. 16 is a detail in plan of the structure shown in FIG. 15 with the parts shown in the dotted line position.

Referring to FIGS. 1 to 7, and FIGS. 15 and 16, inclusive of the drawings, depicting a preferred embodiment of the invention, A and B indicate a pair of straight edged panels of corresponding thickness to be connected together edge to edge in co-planar relation to each other. The panels A–B are each fitted along the margins to be joined with a pair of angle iron rails C–D respectively, which rails embody a pair of webs $a$–$b$ and $a'$–$b'$ respectively extending at right angles relative to each other.

The rail C has the web $a$ thereof seated on one side of the panel A with the web $b$ projecting outwardly from the panel and with its outer face flush with the adjacent margin of the panel. In like fashion the rail D has its web $a'$ seated on a side of the panel B with its other web $b'$ projecting outwardly from the panel B and with its outer face flush with the margin of the panel. The rails C–D are rigidly affixed to the panels A–B preferably by means of a suitable adhesive and are preferably extended throughout the lengths of the panels. The rails C–D thus arranged are adapted to abut in alignment with each other throughout the lengths of the webs $b$–$b'$.

Means are provided for effecting detachable connection between the webs $b$–$b'$, which means embodies correspondingly arranged complementary key-hole slots 15–16 extending longitudinally of the webs $b$–$b'$ at spaced intervals along the lengths of the rails C–D; the slots 15–16 registering with each other when the rails C–D are disposed in aligned abutting relation to each other.

Slidably mounted on the inner side of the web $b$ of the rail C and extending longitudinally thereof in overlying relation to the slots 15 is a slide-bar 17 on which is mounted a series of spaced studs 18 which project at right angles from one side of the bar and are adapted to be extended through the registering slots 15–16. A head 19 is provided on the outer end of each of the studs 18 having side margins the inner faces of which are spaced a short distance from the contiguous side of the web $b'$ when the parts are assembled, as shown in FIGS. 2–3. The studs 18 thus have a length slightly greater than the combined thickness of the webs $b$–$b'$, which the heads 19 are dimensioned to pass through the enlarged ends of the slots 15–16 and to then overlay the margins of the narrow ends of the slots 15–16 when the studs are positioned in such narrow ends.

A headed stud 18–19 is provided on the slide-bar 17 for each pair of the slots 15–16 in the rails C–D; the slide bar and rails being of substantially corresponding lengths.

Extending longitudinally of the side margins of the narrow end portions of the key-hole slots 16, on the inner faces of the web $b'$ are inclined ribs 20, the outer faces of which lead diagonally outward from the inner ends of the ribs adjacent the enlarged ends of the slots to the outer ends thereof. The opposed side margins of the heads 19 of the studs 18 are designed to seat on the outer faces of the ribs 20 to effect wedge engagement therewith on advance of the slide-bar 17.

Movement of the slide-bar is preferably effected by screwing a nut 21 on a threaded stem 22 affixed to and projecting longitudinally from the outer end of the slide-bar 17 and slidably extending through an aperture 23 in an end wall 24 formed on an end of the rail C. A washer 25 may be interposed between the nut 21 and the wall 24.

Means are provided for slidably supporting and guiding the slide-bar 17 against the inner face of the web b of rail C, which means is here shown as comprising a plurality of spaced projections 26 on the wall b of the rail C extending in sliding contact with the upper margin of the slide bar the lower margin of which is slidably seated on the upper face of the web a; the projections 26 having flanges d overlying the outer face of the slide-bar 17 and forming channels e in which the slide-bar is guided. The projections 26 are in the form of elongate tongues struck from the upper marginal portion of the web b, which tongues, for purposes hereinafter specified, project over the upper margin of the slide-bar 17 in diagonal relation thereto with the outer side of the tongue extending in an obtuse angle relative to the inner side of the web b.

Supplementing the projections 26 are tongues 27 struck from the upper margin of the web b and bent to overlie the upper margin of the slide bar 17 in sliding contact therewith, which tongues are spaced suitable distances apart along the length of the rail C.

On equipping a pair of panels A-B with marginal walls or webs b-b' such as is afforded by the angle-iron rails C-D, having key-hole slots 15-16, with the wall b fitted with a slide bar 17 having headed studs 18-19 thereon projecting through the enlarged ends of the slots 15, such walls b-b' are abutted face-to-face in alignment throughout the lengths thereof with the slots 15 in the wall b opposite and in register with the slots 16 in the wall b'. In so doing the heads 19 of the several studs 18 are passed through the enlarged ends of the several slots 16 in the walls b' and positioned opposite the inner ends of the inclined ribs 20 bordering the reduced ends of the slots 16. The threaded end of the stem 22 of the slide bar 17 being previously inserted through the aperture 23 and engaged by the nut 21 tightening of the nut on the stem 22 to bear against the end wall 24 will act to pull the slide bar 17 longitudinally along the guide channels e and thereby advance the heads 19 upwardly on the inclined ribs 20 thereby tightly clamping the webs b-b' of the rails C-D together, as shown in FIG. 2.

From the foregoing it will be seen that the rails C-D and their associated panels A-B may thus be connected together at intervals throughout their lengths by a single longitudinal movement of the slide-bar 17 in one direction and that separation of the connected members may be effected by moving the slide-bar in the opposite direction, to dispose the heads opposite the enlarged ends of the slots 15 and then withdrawing the heads from engagement with the rail C.

Means are provided for automatically disengaging the heads 19 from the walls or webs b-b' on retracting the slide-bar 17 from an advanced position. This means includes inclined tongues 28 struck from the upper margin of the slide-bar 17 and projecting diagonally from the outer side of the latter with a tongue extending parallel with each of the projections 26 contiguous thereto and in front thereof; the tongues 28 being spaced from the tongues 26 when the slide-bar 17 is in its advanced position, as is also the spaces f formed in the upper margin of the slide-bar in producing the tongues 28. When the slide-bar is thus disposed the channels e on the under sides of the tongues 26 will extend astride the upper margin of the slide bar 17, as particularly shown in FIG. 15, in which position the heads 19 will be tightly wedged in engagement with the ribs 20.

When it is desired to effect separation of the connection, the slide-bar 17 is retracted by loosening the nut 21 on the stem 22 and then advancing the slide-bar, as by imparting a blow to the outer end of the stem 22, thereby causing the tongues 28 on the slide-bar to advance against the outer face of the projections 26, so that continued advance movement of the slide-bar will cause the tongues 28 and 26 to co-act and deflect the slide-bar laterally outward from the web b as indicated in dotted lines in FIG. 5, thereby withdrawing the headed studs 18-19 clear of the key-hole slots 15-16 and free of the webs b-b', the heads 19 of the studs in the meantime having advanced to a position opposite the enlarged end of the key-hole slots. This retraction of the slide-bar 17 advances the spaces f in the upper margin thereof opposite the channels e on the under side of the projections 26, thereby permitting bodily outward movement of the slide-bar 17 away from the web b. As a means for preventing the slide-bar 17 from falling clear of the assemblage, up standing pins 29 are provided at intevals along the upper side of the web a adjacent the margin thereof, which pins form abutments which limit lateral movement of the slide-bar when it is disengaged from the projections 16. On thus freeing the head studs from the webs b-b', the rails C-D and panels A-B may be readily separated.

In the above recited construction, the manipulation of the operating mechanism is effected at an end of an assemblage, which in some instances would be inconvenient if not impossible, and accordingly means are provided for effecting reciprocation of the slide-bar at a point spaced inwardly from an end thereof and through the side of a panel. Such means is here depicted in FIGS. 8 and 9 wherein the slide-bar is shown as having a portion of the length of its inner side provided with a toothed rack 30 and an elongate slot 31 is formed in the web a opposite a complementary slot 32, in the panel A. The margin of the slot 31 opposite and spaced from the rack 30 is formed with rack teeth 33 and interposed between the racks 30-33 is a withdrawal spur-gear 34 meshing with the racks 30-33, which gear is fitted with a handle 35. Rotation of the spur gear 34 effects longitudinal movement of the slide-bar 17 in either direction according to the direction of the rotation of the gear 34.

The connector herein set forth is subject to various applications of which several are shown in FIGS. 10 to 14 inclusive, in each of which views the locking element, embodying the invention, is indicated generally by the reference character X which element includes the slide-bar 17, shown in cross section and here shown as mounted to slide longitudinally in a guideway 26; the slide-bar being equipped with headed studs 18-19 which project through registering key-hole slots 15-16 in abutting webs or walls b-b' and seated on inclined ribs 20 as before described.

FIG. 10 shows an arrangement wherein a pair of panels E-F are connected at their margins by the connector X to extend in angular relation to each other with the connector located interiorly of the angle formed by the panels. In this instance the walls or webs b-b' are united with webs g-g' extending at an acute angle therefrom which webs are secured to the inner sides of the panels E-F in a position wherein the outer sides of the webs b-b' may be abutted in effecting interconnection thereof by the connector X.

FIG. 11 shows an arrangement wherein a pair of panels G-H are connected at their margins by the connector X to extend in angular relation to each other with the connector located exteriorly of the angle or apex formed by the panels. In this instance the walls or webs b-b' are united with webs h-h' extending at an obtuse angle therefrom which webs h-h' are secured to the outer sides of the panels G-H in a position wherein the outer sides of the webs b-b' may be abutted in effecting interconnection thereof by the connector X.

FIG. 12 shows an arrangement wherein the webs b–b' constitute integral flanges on the side margins of a panel A' and wherein a plurality of such panels are aligned in a row with their adjacent flanged margins b–b' abutting and united by the connectors X.

FIG. 13 illustrates a construction wherein the webs b–b' constitute the side-walls of a pair of tubes I–J of triangular cross section which are applied to marginal portions of a pair of panels K–L in fixed relation thereof, the webs b–b' being united by the connector X to thereby join the panels K–L edge to edge. A thin sheet panel M is interposed between the pair of tubes I–J to produce a partition where such is required. By this arrangement the tubes I–J may be utilized as conduits for electrical conductors.

In the arrangement shown in FIG. 14 the webs b–b' are shown as constituting one of the walls of rectangular tubes N–O which are attached to the margins of panels P–Q to be united. In this instance a series of four of the tubes N–O are employed in the construction of a shear joint, being utilized in the connection and support of panels P–Q in forming the spaced side walls of a wall and also in supporting a partition R particularly where the interior of the wall is to be filled with a fibrous foam or cellulose insulation S as indicated. The sides of the adjacent tubes N–O formed by the webs b–b' are abutted and united by the connectors X.

I claim:

1. A pair of generally planar elements having laterally projecting marginal walls abutting each other, said walls having registering complementary longitudinally extending key-hole slots, a slide-bar reciprocally mounted on one of said walls, studs on said slidebar extending through said slots, heads on said studs, inclined ribs on the side margins of said slots slidably engaged by the heads of said studs, means for forcibly reciprocating said slide-bar to advance said heads over said ribs, and means operable by retraction of said slide-bar from an advanced position to eject said headed studs out of said slots laterally of said marginal walls.

2. The structure called for in claim 1 wherein said last-named means consists of inclined tongues on said slide-bar and inclined projections on said one of said walls engageable with said tongues on retraction of said slide-bar.

3. The structure called for in claim 2 wherein said projections have channels on their lower margins arranged to slidably engage said slide bars.

4. The structure called for in claim 2 wherein said projections have channels on their lower margins arranged to slidably engage said slide-bars, said slide-bar having spaces in the upper margins thereof adjacent said tongues positionable opposite said channels when said tongues abut said projections.

References Cited

UNITED STATES PATENTS

| 2,010,412 | 8/1935 | Parsons | 52—242 |
| 2,033,100 | 3/1936 | Kellogg | 52—483 |
| 2,137,767 | 11/1938 | Betcone | 52—704 |

FOREIGN PATENTS

| 855,675 | 2/1940 | France. |
| 286,041 | 7/1915 | Germany. |
| 606,778 | 8/1948 | Great Britain. |

FRANK L. ABBOTT, *Primary Examiner.*

JAMES L. RIDGILL, *Assistant Examiner.*

U.S. Cl. X.R.

52—282, 582; 287—189.36; 292—160